United States Patent
Chen et al.

(10) Patent No.: US 10,385,954 B2
(45) Date of Patent: Aug. 20, 2019

(54) INTERFERENCE-TYPE TORQUE SPLIT DIFFERENTIAL

(71) Applicant: INDUSTRIAL TECHNOLOGY RESEARCH INSTITUTE, Hsinchu (TW)

(72) Inventors: Peng-Yu Chen, Hsinchu (TW);
Cheng-Ping Yang, Hsinchu (TW);
Yung-Chi Chang, Hsinchu (TW);
Po-Wen Chen, Hsinchu (TW);
Jui-Tang Tseng, Hsinchu (TW);
Jenq-Huey Shyu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 36 days.

(21) Appl. No.: 15/835,045

(22) Filed: Dec. 7, 2017

(65) Prior Publication Data
US 2019/0120362 A1  Apr. 25, 2019

(30) Foreign Application Priority Data
Oct. 20, 2017  (TW) .............................. 106136126 A (51) Int. Cl.
*F16H 48/22*  (2006.01)
*F16H 48/40*  (2012.01)
(Continued)

(52) U.S. Cl.
CPC ............. *F16H 48/22* (2013.01); *B60K 17/16* (2013.01); *B60K 17/3462* (2013.01);
(Continued)

(58) Field of Classification Search
CPC ...... F16H 48/22; F16H 48/38; F16H 2048/04; F16H 2048/202; B60K 17/16; B60K 23/0808
See application file for complete search history.

(56) References Cited

U.S. PATENT DOCUMENTS

| 8,057,351 B2 | 11/2011 | Joachim et al. |
| 8,517,883 B2 * | 8/2013 | Gassmann .............. F16H 48/22 475/214 |

(Continued)

FOREIGN PATENT DOCUMENTS

| CN | 2773412 Y | 4/2006 |
| CN | 105358356 A | 2/2016 |

(Continued)

OTHER PUBLICATIONS

Bernades, Torque split between left and right drive shaft over a front wheel drive differential, Master's Thesis in Vehicle Dynamics and Autonomous Systems, Jan. 1, 2012, pp. 1-189.

(Continued)

*Primary Examiner* — Mark J Beauchaine
(74) *Attorney, Agent, or Firm* — Rabin & Berdo, P.C.

(57) ABSTRACT

An interference-type torque split differential includes a differential housing, a first differential gear and an interference-type torque split module. The first differential gear is provided in the differential housing. The interference-type torque split module is provided outside the differential housing and has a second differential gear, a first brake source and a second brake source. The second differential gear is connected with the first differential gear. The first brake source and the second brake source are at two sides of the second differential gear, respectively. The first brake source or the second brake source provides multiple stages of clamping force for performing torque split.

20 Claims, 8 Drawing Sheets

(51) Int. Cl.
*B60K 17/16* (2006.01)
*B60K 23/08* (2006.01)
*B60K 17/346* (2006.01)
*F16H 48/36* (2012.01)
*F16H 48/20* (2012.01)

(52) U.S. Cl.
CPC ......... *B60K 23/0808* (2013.01); *F16H 48/40* (2013.01); *F16H 2048/207* (2013.01); *F16H 2048/368* (2013.01)

(56) References Cited

U.S. PATENT DOCUMENTS

| | | | |
|---|---|---|---|
| 8,734,284 | B1 | 5/2014 | Yang |
| 8,808,132 | B2 | 8/2014 | Ross |
| 9,267,510 | B2 | 2/2016 | Tadokoro et al. |
| 9,625,026 | B2 | 4/2017 | Cochren et al. |
| 2010/0255947 | A1 | 10/2010 | Povirk et al. |
| 2012/0252621 | A1 | 10/2012 | Seidl et al. |
| 2015/0204431 | A1 | 7/2015 | Cochren et al. |

FOREIGN PATENT DOCUMENTS

| | | |
|---|---|---|
| TW | M299096 U | 10/2006 |
| TW | M412887 U | 10/2011 |
| TW | M454359 U | 6/2013 |
| WO | WO-2015130847 A1 | 9/2015 |

OTHER PUBLICATIONS

Myszka et al., A Mechanical Regenerative Brake and Launch Assist using an Open Differential and Elastic Energy Storage, SAE Int. J. Alt. Power, vol. 4, Issue 1, Apr. 14, 2015, pp. 199-208.

Sawase et al., Classification and analysis of lateral torque-vectoring differentials using velocity diagrams, Proc. IMechE vol. 222 Part D: J. Automobile Engineering, May 19, 2008, pp. 1527-1541.

Hancock, Vehicle handling control using active differentials, A Doctoral Thesis, Jun. 18, 2006, pp. 1-19.

Park et Al., Dana Torque Vectoring Differential Dynamic Trak, Proceedings of the 2004 SAE Automotive Dynamics, Stability & Controls Conference, May 4-6, 2004, 8 pages.

Ross et al., Development of an Electronically-Controlled, Limited-Slip Differential (eLSD) for FWD Applications, Transmissions & Drivelines, Apr. 16-19, 2007, 13 pages.

Deur et al., Modeling and analysis of active differential dynamics, Journal of Dynamic Systems, Measurement, and Control, Nov. 2010, vol. 132, Dec. 1, 2010, 061501-1-061501-14.

Taiwan Patent Office, Office Action, Patent Application Serial No. TW10720687330, Jul. 30, 2018, 4 pages.

\* cited by examiner

INTERFERENCE-TYPE TORQUE SPLIT DIFFERENTIAL

CROSS-REFERENCE TO RELATED APPLICATION

The present disclosure is based on, and claims priority from, Taiwan Application Number 106136126, filed Oct. 20, 2017, the disclosure of which is hereby incorporated by reference herein in its entirety.

BACKGROUND

1. Technical Field

The present disclosure relates to torque split differentials, and, more particularly, to an interference-type torque split differential.

2. Description of Related Art

Figure 1:
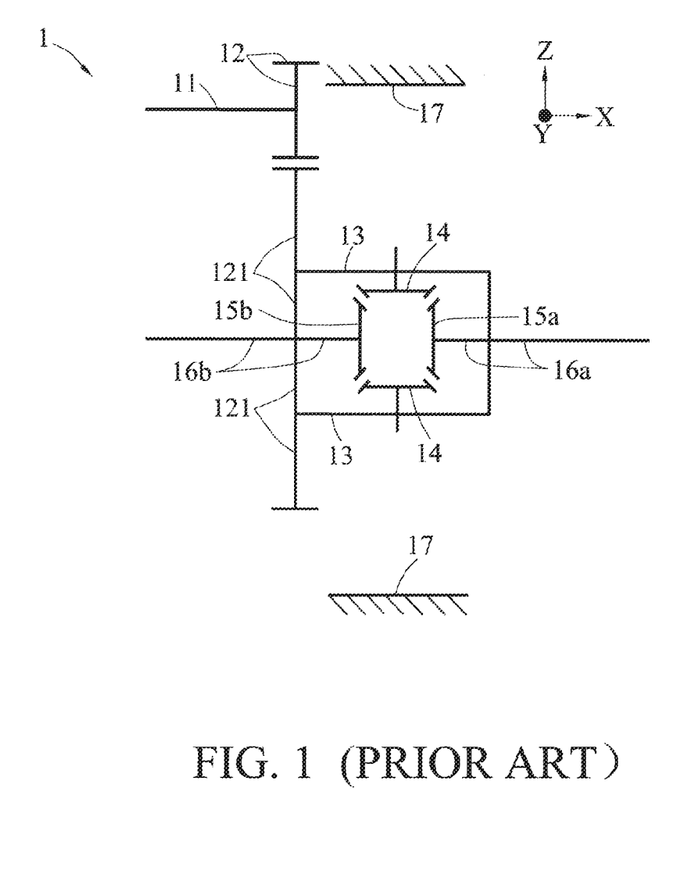
FIG. 1 is a schematic diagram of a standard differential according to the prior art.

Referring to FIG. 1, a schematic diagram of a standard differential 1 mounted on a vehicle according to the prior art is shown. The standard differential 1 includes a power input shaft 11, a power input gear 12, a power output gear 121, a differential housing 13, a first differential gear 14, a first output gear 15a, a second output gear 15b, a first output shaft 16a, a second output shaft 16b and a gearbox housing 17. The power input shaft 11 provides power to sequentially drive the power input gear 12, the power output gear 121, the differential housing 13 and the first differential gear 14, and the first output gear 15a (the second output gear 15b) and the first output shaft 16a (the second output shaft 16b).

However, one of the drawbacks of the standard differential 1 is that the general differential 1 cannot achieve torque split. In other words, torque cannot be correctly distributed to the wheels on either side of a vehicle when the vehicle slips. Further, when the wheels on either side of the vehicle travel or turn on a road having different coefficients of friction, the vehicle tends to have poor driving stability or a reduced transmission performance. Therefore, there is a need for a solution that addresses the aforementioned issues in the prior art.

SUMMARY

The present disclosure provides an interference-type torque split differential that maintains the functionality of a standard differential while achieving torque split.

An interference-type torque split differential according to the present disclosure may include: a differential housing; a first differential gear provided in the differential housing; and an interference torque split module provided outside the differential housing and including: a second differential gear connected with the first differential gear; and a first brake source and a second brake source providing multiple stages of clamping force for performing torque split.

Another interference-type torque split differential of the present disclosure may include: a differential housing; a first differential gear provided in the differential housing; and an interference torque split module provided outside the differential housing and including: a second differential gear connected with the first differential gear; and a driving source providing multiple stages of driving force for performing torque split.

BRIEF DESCRIPTION OF THE DRAWINGS

FIGS. 2A, 2B, 3A and 3B are schematic diagrams depicting an interference-type torque split differential in accordance with a first embodiment of the present disclosure, wherein FIG. 2B is a block diagram of FIG. 2A, and FIGS. 3A and 3B illustrate different torque split modes of the interference-type torque split differential of FIG. 2A;

FIGS. 4A and 4B are schematic diagrams depicting an interference-type torque split differential in accordance with a second embodiment of the present disclosure, wherein

FIGS. 5A, 5B, 6A and 6B are schematic diagrams depicting an interference-type torque split differential in accordance with a third embodiment of the present disclosure, wherein FIG. 5B is a block diagram of FIG. 5A, and FIGS. 6A and 6B illustrate different torque split modes of the interference-type torque split differential of FIG. 5A;

FIGS. 7A and 7B are schematic diagrams depicting an interference-type torque split differential in accordance with a fourth embodiment of the present disclosure, wherein

DETAILED DESCRIPTION

The present disclosure is described by the following specific embodiments. Those with ordinary skills in the arts can readily understand other advantages and functions of the present disclosure after reading the disclosure of this specification. The present disclosure may also be practiced or applied with other different implementations. Based on different contexts and applications, the various details in this specification can be modified and changed without departing from the spirit of the present disclosure.

It should be noted that in FIG. 2A, 4A, 5A, or 7A, only the upper and lower portions of components, such as a first differential gear 14, a gearbox housing 17, a second differential gear 21, a first brake source 23a, a second brake source 23b, an interference wheel 24, a first interference wheel 24a or a second interference wheel 24b, are shown, with the middle portion thereof omitted. Therefore, each of these components is one in number, not two.

Figure 2A:
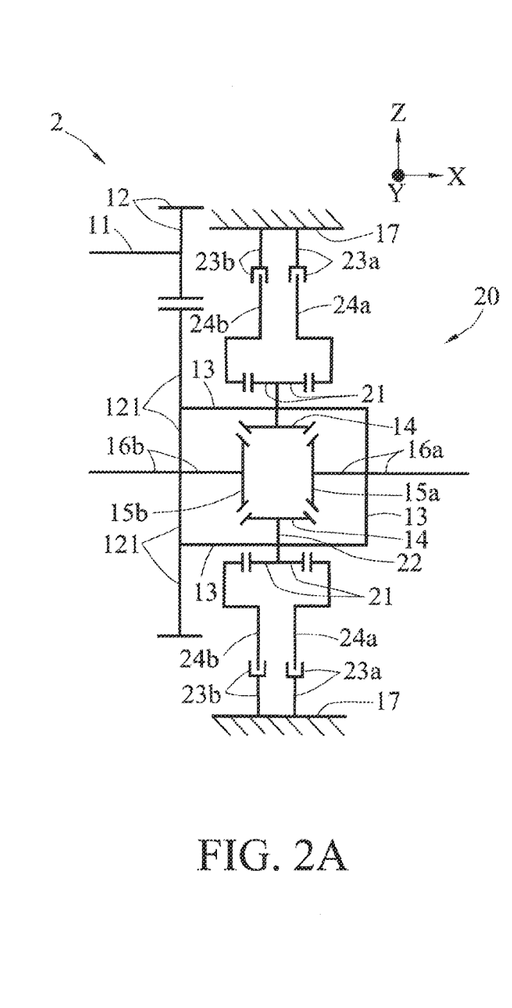
Figure 2B:
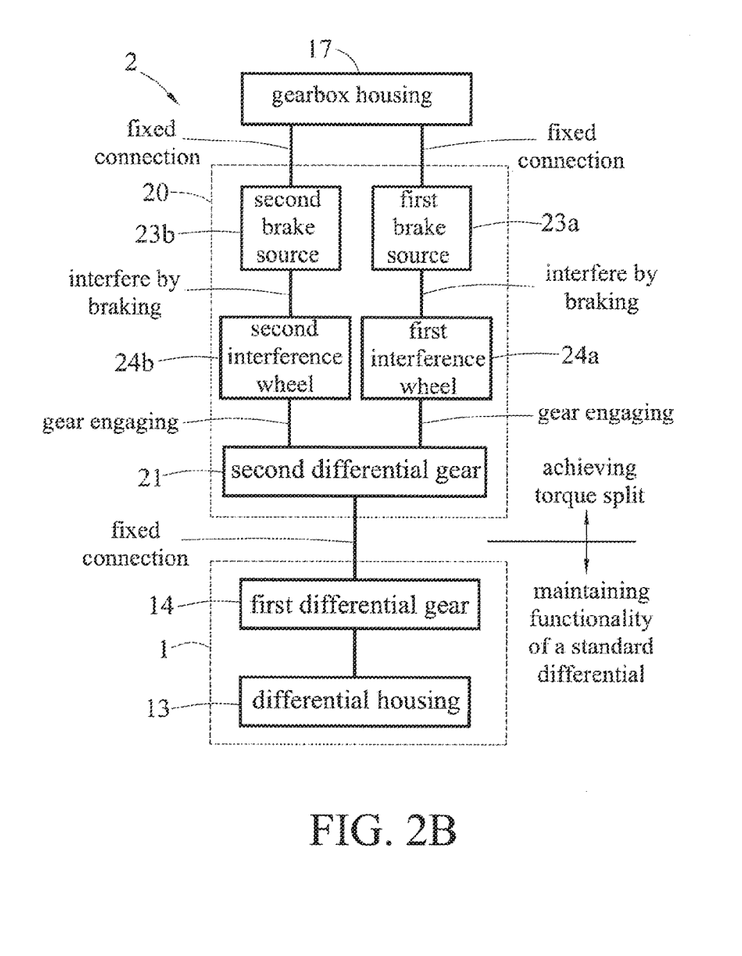
Figure 3A:
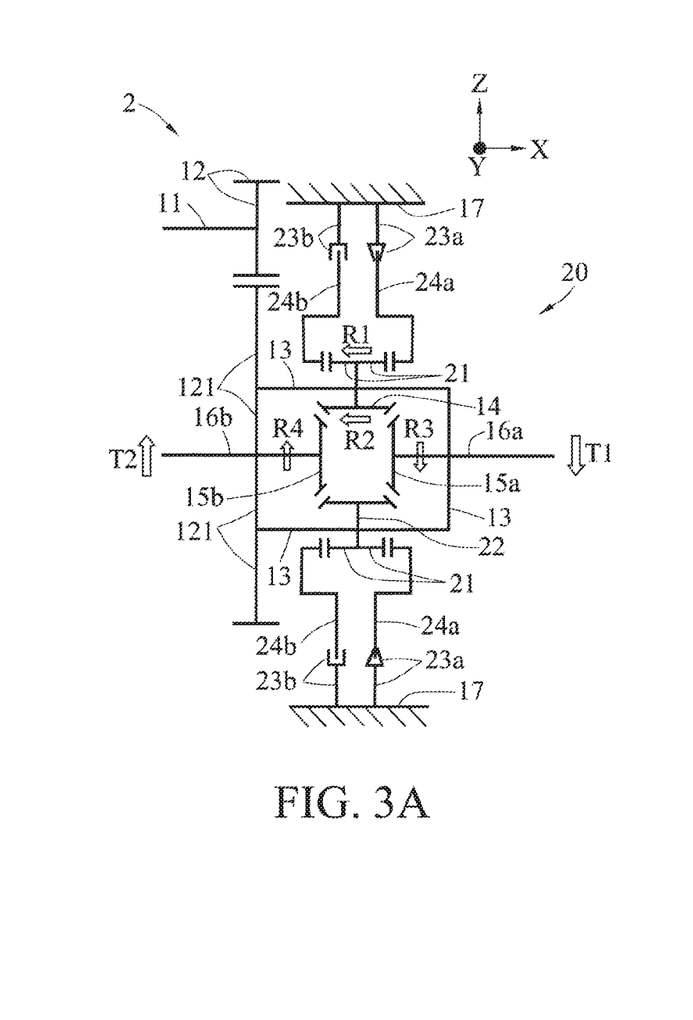
Figure 3B:
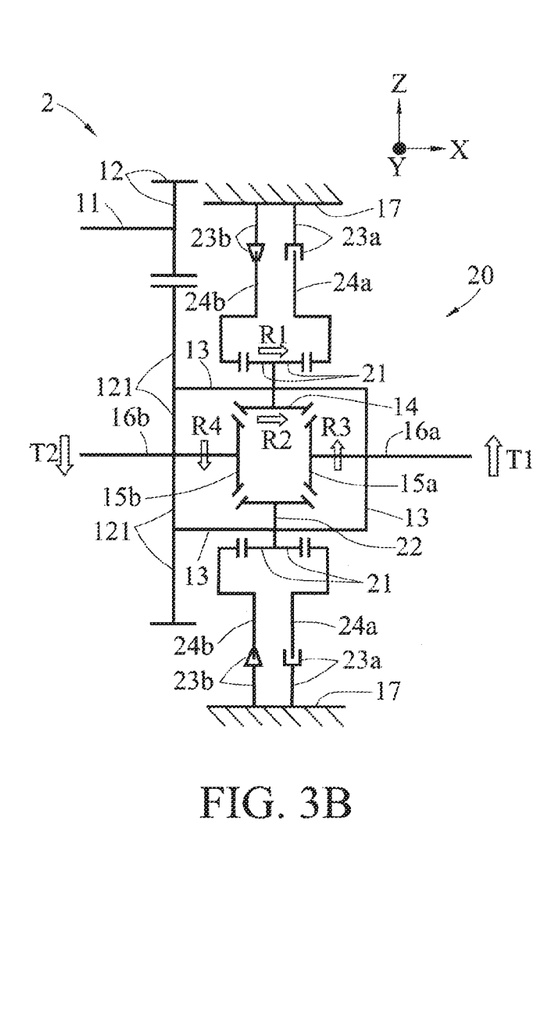

FIGS. 2A, 2B, 3A and 3B are schematic diagrams depicting an interference-type torque split differential 2 in accordance with a first embodiment of the present disclosure, wherein FIG. 2B is a block diagram of FIG. 2A, and FIGS. 3A and 3B illustrate different torque split modes of the interference-type torque split differential 2 of FIG. 2A.

As shown in FIGS. 2A to 2B, the interference-type torque split differential 2 may include a power input shaft 11, a power input gear 12, a power output gear 121, a differential housing 13, a first differential gear 14, a first output gear 15a, a second output gear 15b, a first output shaft 16a (e.g., a right output shaft), a second output shaft 16b (e.g., a left output shaft) and a gearbox housing 17, similar to those shown in FIG. 1.

The power input gear 12 is connected to the power input shaft 11. The power output gear 121 has gears engaged with gears of the power input gear 12. The differential housing 13 is connected with the power output gear 121. The first differential gear 14 is provided in the differential housing 13 and connected with the differential housing 13 via a turning shaft 22. The turning shaft 22 is rotated by the differential housing 13, which is in turn driven by a power source (not shown). The first output gear 15a and the first differential gear 14 have their gears engaged, and the second output gear 15b and the first differential gear 14 also have their gears engaged. The first output shaft 16a and the second output shaft 16b are connected with the first output gear 15a and the second output gear 15b, respectively.

The power input shaft 11 provides power to sequentially drive the power input gear 12, the power output gear 121, the differential housing 13 and the first differential gear 14, the first output gear 15a (and the second output gear 15b), and the first output shaft 16a (and the second output shaft 16b).

The interference-type torque split differential 2 may further include an interference torque split module 20. The interference torque split module 20 is provided outside the differential housing 13, and includes a second differential gear 21, a first brake source 23a and a second brake source 23b. The second differential gear 21 can be fixed to or in rigid connection with the first differential gear 14 via the turning shaft 22. The first brake source 23a or the second brake source 23b can be a clamping device or a clutch device having different levels of clamping forces for performing torque split.

The interference torque split module 20 may further include a first interference wheel 24a provided between the second differential gear 21 and the first brake source 23a. The first brake source 23a is able to adjust the rotating speed of the first interference wheel 24a to provide multiple stages of speed. For example, the first brake source 23a is able to reduce the rotating speed of the first interference wheel 24a to put it in several different reduced speeds. The first brake source 23a brakes and interferes with the second differential gear 21 via the first interference wheel 24a for performing torque split.

The interference torque split module 20 may further include a second interference wheel 24b provided between the second differential gear 21 and the second brake source 23b. The second brake source 23b is able to adjust the rotating speed of the second interference wheel 24b to provide multiple stages of speed. For example, the second brake source 23b is able to reduce the rotating speed of the second interference wheel 24b to put it in several different reduced speeds. The second brake source 23b brakes and interferes with the second differential gear 21 via the second interference wheel 24b for performing torque split.

The interference-type torque split differential 2 includes the gearbox housing 17, which can be fixed to or in rigid connection with the first brake source 23a and the second brake source 23b.

The interference-type torque split differential 2 includes the first output gear 15a and the first output shaft 16a. The first output gear 15a is provided in the differential housing 13. The first output gear 15a has gears engaged with gears of the first differential gear 14, and the first output shaft 16a is connected with the first output gear 15a.

The interference-type torque split differential 2 includes the second output gear 15b and the second output shaft 16b. The second output gear 15b is provided in the differential housing 13. The second output gear 15b has gears engaged with gears of the first differential gear 14, and the second output shaft 16b is connected with the second output gear 15b.

For example, as shown in FIG. 3A, in terms of the torque split mode of the interference-type torque split differential 2, when the first brake source 23a is used to brake and interfere with the first interference wheel 24a, the first interference wheel 24a drives the second differential gear 21, the second differential gear 21 drives the first differential gear 14, the first differential gear 14 simultaneously drives the first output gear 15a and the second output gear 15b, and the first output gear 15a and the second output gear 15b drive the first output shaft 16a and the second output shaft 16b, respectively.

Therefore, according to the right hand rule, the second differential gear 21 and the first differential gear 14 rotate in a clockwise direction R1 and a clockwise direction R2 (shown as left arrows) around a Z axis, respectively, the first output gear 15a and the first output shaft 16a both rotate in an anticlockwise direction R3 around an X axis (shown as a downward arrow), while the second output gear 15b and the second output shaft 16b both rotate in a clockwise direction R4 around the X axis (shown as an upward arrow). As such, a driving force and torque split range T1 of the first output shaft 16a is reduced, while a driving force and torque split range T2 of the second output shaft 16b is increased, thereby achieving driving force and torque split.

On the contrary, as shown in FIG. 3B, in terms of the torque split mode of the interference-type torque split differential 2, when the second brake source 23b is used to brake and interfere with the second interference wheel 24b, the second interference wheel 24b drives the second differential gear 21, the second differential gear 21 drives the first differential gear 14, the first differential gear 14 simultaneously drives the first output gear 15a and the second output gear 15b, and the first output gear 15a and the second output gear 15b drive the first output shaft 16a and the second output shaft 16b, respectively.

Therefore, according to the right hand rule, the second differential gear 21 and the first differential gear 14 rotate in an anticlockwise direction R1 and an anticlockwise direction R2 (shown as right arrows) around the Z axis, respectively, the first output gear 15a and the first output shaft 16a both rotate in a clockwise direction R3 around an X axis (shown as an upward arrow), while the second output gear 15b and the second output shaft 16b both rotate in an anticlockwise direction R4 around the X axis (shown as a downward arrow). As such, the driving force and torque split range T1 of the first output shaft 16a is increased, and the driving force and torque split range T2 of the second output shaft 16b is reduced, thereby achieving driving force and torque split.

Furthermore, when the first brake source 23a and the second brake source 23b are not in action, the first interference wheel 24a and the second interference wheel 24b are free to turn and do not interfere with the second differential gear 21, such that the interference-type torque split differential 2 acts like or similar to the standard differential 1 in FIG. 1, but is not limited to this.

Figure 4A:
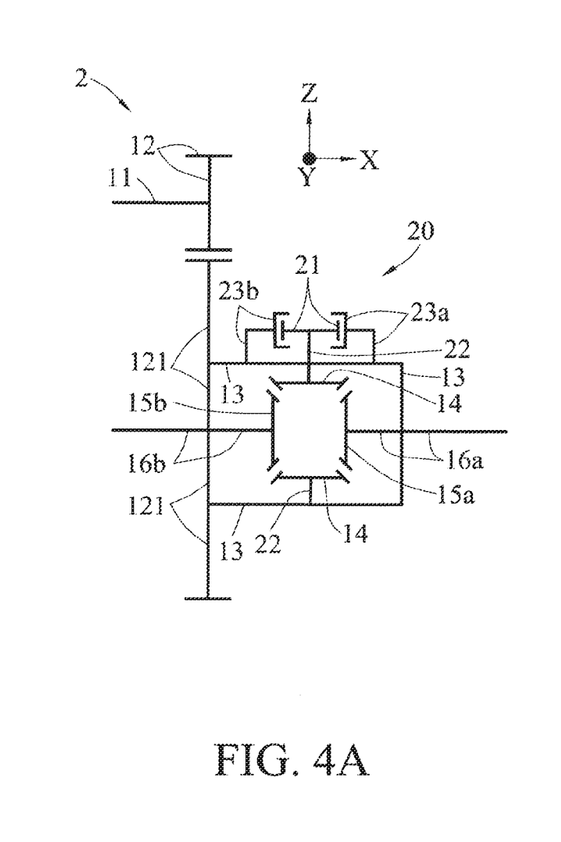
Figure 4B:
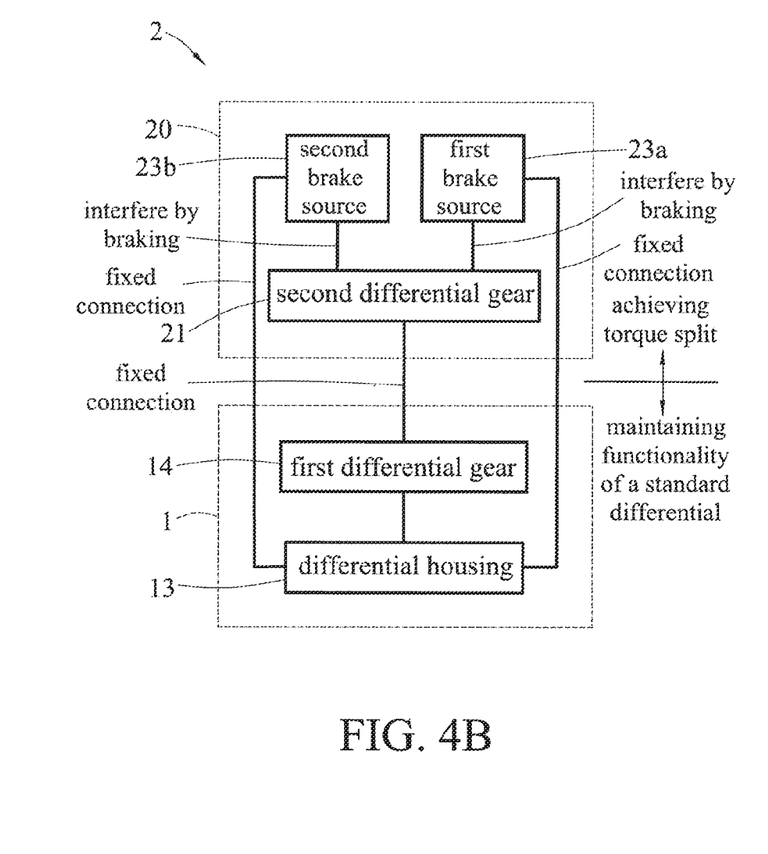
FIG. 4B is a block diagram of FIG. 4A.

FIGS. 4A and 4B are schematic diagrams depicting an interference-type torque split differential 2 in accordance with a second embodiment of the present disclosure, wherein FIG. 4B is a block diagram of FIG. 4A. The interference-type torque split differential 2 shown in FIGS. 4A and 4B is similar to that shown in FIGS. 2A and 2B, with the major differences described as follow and the rest of the interference-type torque split differential 2 already described with respect to FIGS. 2A and 2B above.

In FIGS. 4A and 4B, the first interference wheel 24a and the second interference wheel 24b of FIGS. 2A and 2B are omitted from the interference-type torque split differential 2. Therefore, the first brake source 23a or the second brake source 23b directly brakes and interferes with the second differential gear 21 for performing torque split.

Figure 5A:
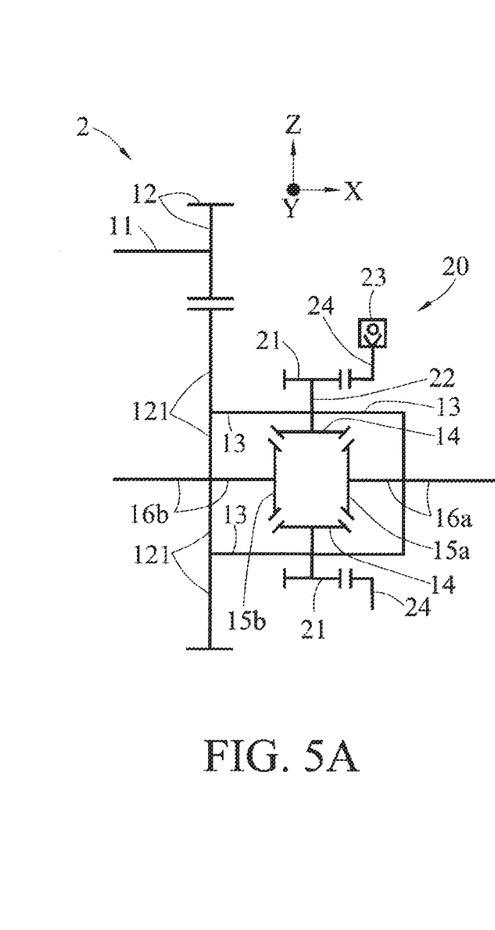
Figure 5B:
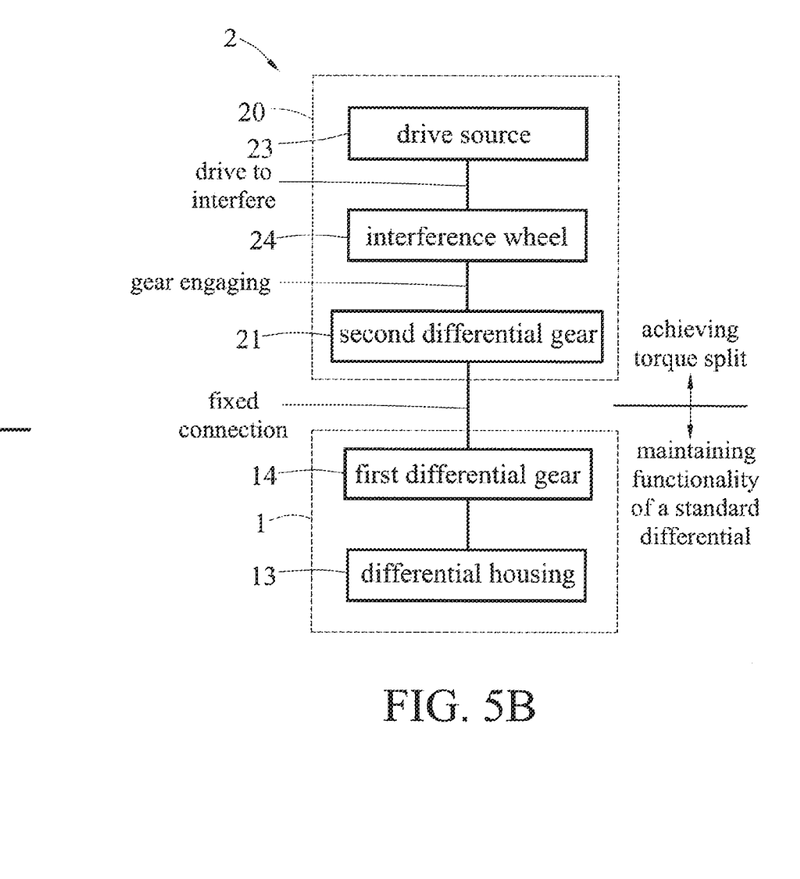
Figure 6A:
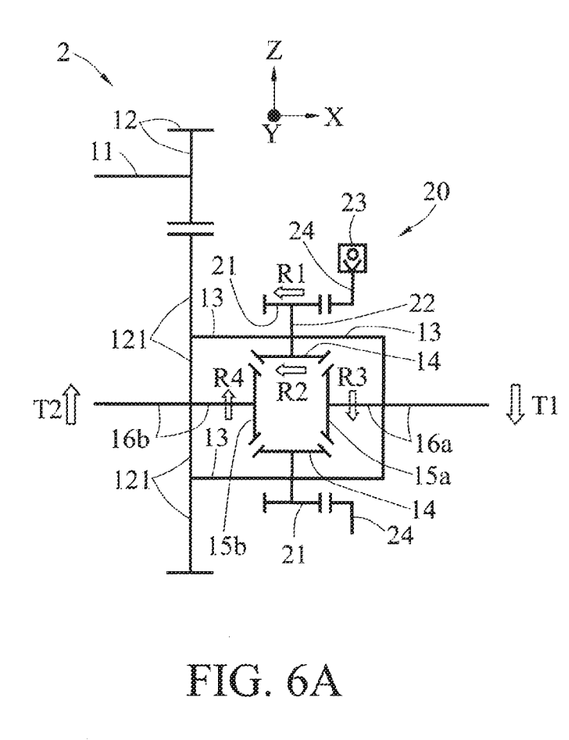
Figure 6B:
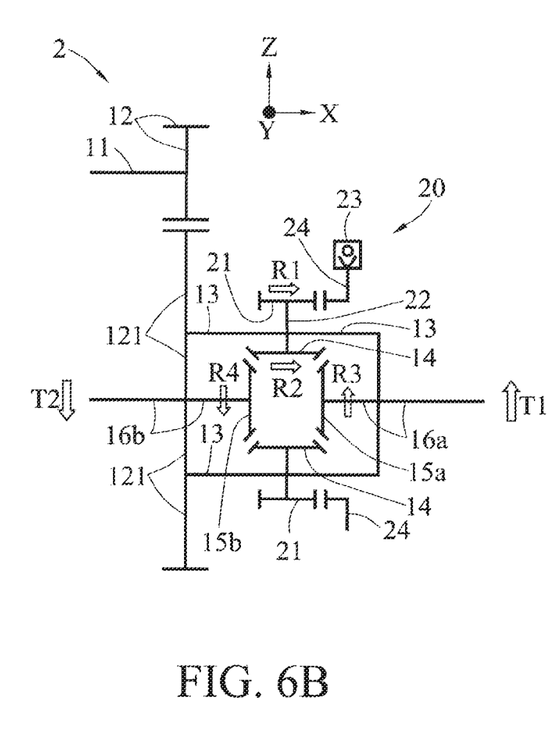

FIGS. 5A, 5B, 6A and 6B are schematic diagrams depicting an interference-type torque split differential 2 in accordance with a third embodiment of the present disclosure, wherein FIG. 5B is a block diagram of FIG. 5A, and FIGS. 6A and 6B illustrate different torque split modes of the interference-type torque split differential 2 of FIG. 5A.

As shown in FIGS. 5A to 5B, the interference-type torque split differential 2 may include a power input shaft 11, a power input gear 12, a power output gear 121, a differential housing 13, a first differential gear 14, a first output gear 15a, a second output gear 15b, a first output shaft 16a, a second output shaft 16b, and a gearbox housing 17, similar to those in the standard differential 1 shown in FIG. 1.

The power input gear 12 is connected to the power input shaft 11, and the differential housing 13 is connected with the power output gear 121. The first differential gear 14 is provided in the differential housing 13 and connected with the differential housing 13 via the turning shaft 22. The first output gear 15a and the first differential gear 14 have their gears engaged, and the second output gear 15b and the first differential gear 14 also have their gears engaged. The first output shaft 16a and the second output shaft 16b are connected with the first output gear 15a and the second output gear 15b, respectively.

The power input shaft 11 provides power to sequentially drive the power input gear 12, the differential housing 13 and the first differential gear 14, the first output gear 15a (and the second output gear 15b), and the first output shaft 16a (and the second output shaft 16b).

The interference-type torque split differential 2 may further include an interference torque split module 20. The interference torque split module 20 is provided outside the differential housing 13, and includes a second differential gear 21, and a driving source 23. The second differential gear 21 can be fixed to or in rigid connection with the first differential gear 14 via the turning shaft 22. The driving source 23 can be a driving motor with driving forces for performing torque split. The driving motor can be a motor without resistance upon reverse input. When the interference-type torque split differential 2 is provided with the driving source 23, the first brake source 23a and the second brake source 23b as shown in FIG. 2A, for example, can be omitted, but the present disclosure is not limited as such.

The interference torque split module 20 may further include an interference wheel 24 provided between the second differential gear 21 and the driving source 23. The driving source 23 is used for adjusting or switching the rotating direction or rotating speed of the interference wheel 24. The driving source 23 drives to interfere with the second differential gear 21 via the interference wheel 24 to achieve torque split.

The interference-type torque split differential 2 includes the first output gear 15a and the first output shaft 16a. The first output gear 15a is provided in the differential housing 13. The first output gear 15a has gears engaged with gears of the first differential gear 14, and the first output shaft 16a is connected with the first output gear 15a.

The interference-type torque split differential 2 includes the second output gear 15b and the second output shaft 16b. The second output gear 15b is provided in the differential housing 13. The second output gear 15b has gears engaged with gears of the first differential gear 14, and the second output shaft 16b is connected with the second output gear 15b.

For example, as shown in FIG. 6A, in terms of the torque split mode of the interference-type torque split differential 2, when the driving source 23 drives the interference wheel 24 in a clockwise direction, the interference wheel 24 drives the second differential gear 21, the second differential gear 21 drives the first differential gear 14, the first differential gear 14 simultaneously drives the first output gear 15a and the second output gear 15b, and the first output gear 15a and the second output gear 15b drive the first output shaft 16a and the second output shaft 16b, respectively.

Therefore, according to the right hand rule, the second differential gear 21 and the first differential gear 14 rotate in a clockwise direction R1 and a clockwise direction R2 (shown as left arrows) around the Z axis, respectively, the first output gear 15a and the first output shaft 16a both rotate in an anticlockwise direction R3 around the X axis (shown as a downward arrow), while the second output gear 15b and the second output shaft 16b both rotate in a clockwise direction R4 around the X axis (shown as an upward arrow). As such, the driving force and torque split range T1 of the first output shaft 16a is reduced, and the driving force and torque split range T2 of the second output shaft 16b is increased, thereby achieving driving force and torque split.

On the contrary, as shown in FIG. 6B, in terms of the torque split mode of the interference-type torque split differential 2, when the driving source 23 drives to interfere with the interference wheel 24, the interference wheel 24 drives the second differential gear 21, the second differential gear 21 drives the first differential gear 14, the first differential gear 14 simultaneously drives the first output gear 15a and the second output gear 15b, and the first output gear 15a and the second output gear 15b drive the first output shaft 16a and the second output shaft 16b, respectively.

Therefore, according to the right hand rule, the second differential gear 21 and the first differential gear 14 rotate in an anticlockwise direction R1 and an anticlockwise direction R2 (shown as right arrows) around the Z axis, respectively, the first output gear 15a and the first output shaft 16a both rotate in a clockwise direction R3 around an X axis (shown as an upward arrow), while the second output gear 15b and the second output shaft 16b both rotate in an anticlockwise direction R4 around the X axis (shown as a downward arrow). As such, the driving force and torque split range T1 of the first output shaft 16a is increased, and the driving force and torque split range T2 of the second output shaft 16b is reduced, thereby achieving driving force and torque split.

Furthermore, when the driving source 23 is not in action, the interference-type torque split differential 2 acts like or similar to the standard differential 1 in FIG. 1, but is not limited to this.

Figure 7A:
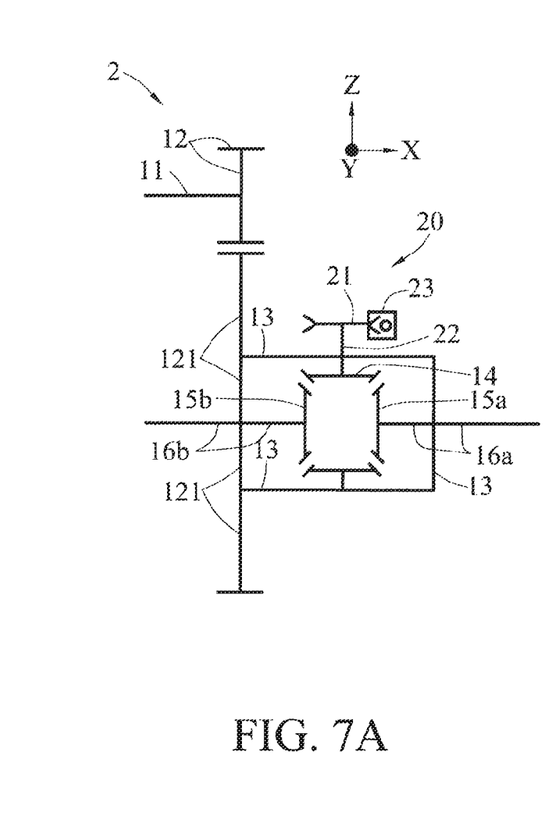
Figure 7B:
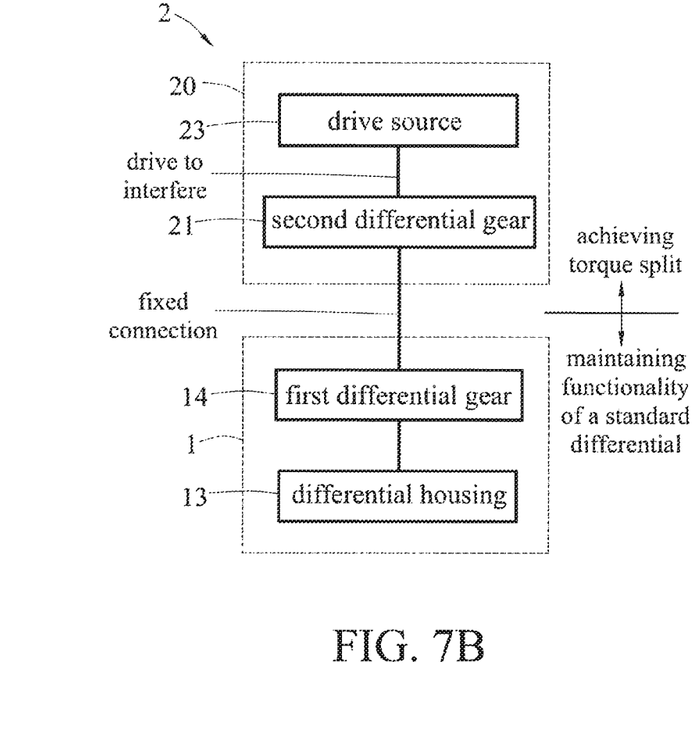
FIG. 7B is a block diagram of FIG. 7A.

FIGS. 7A and 7B are schematic diagrams depicting an interference-type torque split differential 2 in accordance with a fourth embodiment of the present disclosure, wherein FIG. 7B is a block diagram of FIG. 7A. The interference-type torque split differential 2 shown in FIGS. 7A and 7B is similar to that shown in FIGS. 2A and 2B, with the major differences described as follow and the rest of the interference-type torque split differential 2 already described with respect to FIGS. 5A and 5B above.

In FIGS. 7A and 7B, the interference wheel 24 of FIGS. 5A and 5B is omitted from the interference-type torque split differential 2. Therefore, the driving source 23 directly connects to and drives to interfere with the second differential gear 21 for performing torque split. Moreover, the driving source 23 may have gear- or belt-driven type transmission.

Figure 8A:
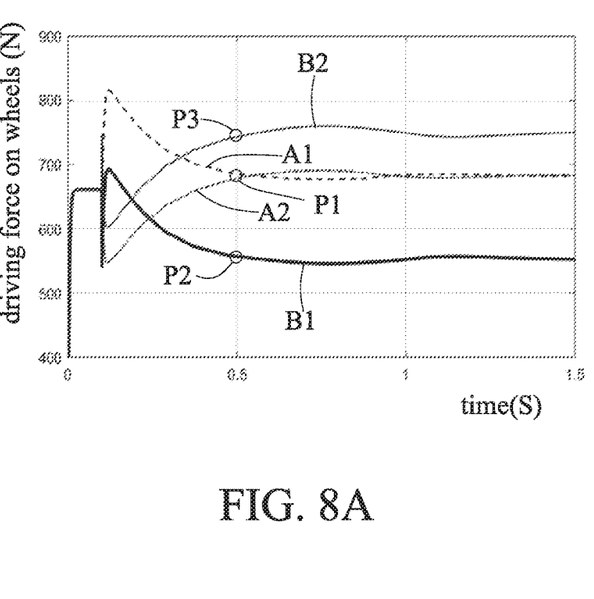
FIG. 8A is a graph depicting a comparison between the torque split ranges of the interference-type torque split differential of FIGS. 2A and 2B and the prior-art standard differential of FIG. 1.
Figure 8B:
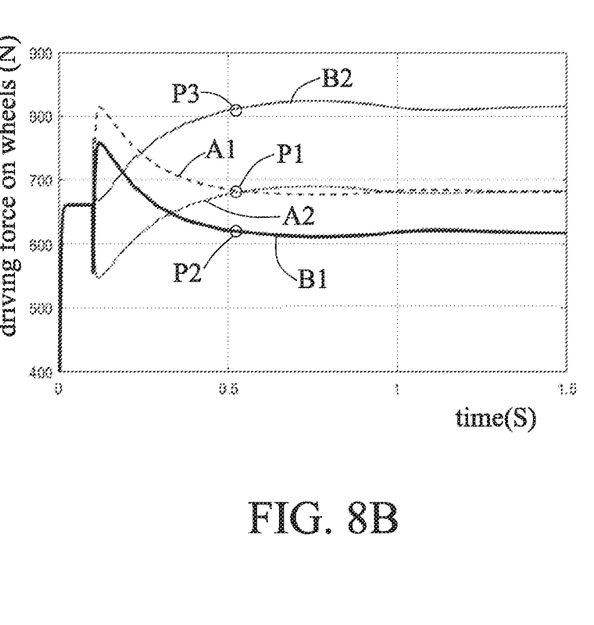
FIG. 8B is a graph depicting a comparison between the torque split ranges of the interference-type torque split differential of FIGS. 5A and 5B and the prior-art standard differential of FIG. 1.

FIG. 8A is a graph depicting a comparison between the driving forces on wheels of the interference-type torque split differential 2 of FIGS. 2A and 2B and the prior-art standard differential 1 of FIG. 1, and FIG. 8B is a graph depicting a comparison between the driving forces on wheels of the interference-type torque split differential 2 of FIGS. 5A and 5B and the prior-art standard differential 1 of FIG. 1, wherein the unit of the vertical axis is in Newton (N), and the unit of the horizontal axis is in seconds (S).

For example, as shown in FIGS. 8A and 8B and FIG. 1 of the prior art, take 0.5 second in FIG. 8A as an example, the driving forces on wheels of the first output shaft 16a (e.g., the right output shaft) of the standard differential 1 after location P1 on a curve A1 and the driving forces on wheels of the second output shaft 16b (e.g., the left output shaft) after location P1 on a curve A2 are both between about 680 to 700 N. Thus, the standard differential 1 cannot achieve effective driving force (torque) split.

On the contrary, as shown in FIG. 8A and FIGS. 2A and 2B of the present disclosure, take 0.5 second in FIG. 8A as an example, the driving forces on wheels of the first output shaft 16a (e.g., the right output shaft) of the interference-type torque split differential 2 of the present disclosure after location P2 on a curve B1 are roughly between 550 to 570 N, and the driving forces on wheels of the second output shaft 16b (e.g., the left output shaft) after location P3 on a curve B2 are roughly between about 740 to 760 N. Therefore, the driving forces on wheels of the second output shaft 16b are significantly greater than those on the first output shaft 16a. In other words, the interference-type torque split differential 2 according to the present disclosure is able to distribute some of the driving force (or torque) from the first output shaft 16a to the second output shaft 16b to achieve effective driving force (or torque) split. However, in other embodiments, the present disclosure may also distribute some of the driving force (or torque) from the second output shaft 16b to the first output shaft 16a to achieve effective driving force (or torque) split.

Similarly, as shown in FIG. 8B and FIGS. 5A and 5B of the present disclosure, take 0.5 second in FIG. 8B as an example, the driving forces on wheels of the first output shaft 16a (e.g., the right output shaft) of the interference-type torque split differential 2 of the present disclosure after location P2 on a curve B1 are roughly between 610 to 630 N, and the driving forces on wheels of the second output shaft 16b (e.g., the left output shaft) after location P3 on a curve B2 are roughly between about 810 to 830 N. Therefore, the driving forces on wheels of the second output shaft 16b are significantly greater than those on the first output shaft 16a. In other words, the interference-type torque split differential 2 according to the present disclosure is able to distribute some of the driving force (or torque) from the first output shaft 16a to the second output shaft 16b to achieve effective driving force (or torque) split. However, in other embodiments, the present disclosure may also distribute some of the driving force (or torque) from the second output shaft 16b to the first output shaft 16a to achieve effective driving force (or torque) split.

It can be understood from the above that the interference-type torque split differential according to the present disclosure adds components, such as a second differential gear, interference wheel(s), brake sources or a driving source, onto the standard differential. These components are modularized into an interference torque split module that is provided outside the differential housing. As a result, the interference-type torque split differential according to the present disclosure not only maintains the functionality of a standard differential, but also achieves effective torque (or driving force) split through the interference torque split module. The interference torque split module further provides numerous benefits such as easy assembly and maintenance and low complexity.

When the interference-type torque split differential according to the present disclosure is installed on a vehicle, for example, the interference-type torque split differential is capable of achieving torque (or driving force) split between the first output shaft (e.g., the right output shaft) and the second output shaft (e.g., the left output shaft). This increases steering and stability of the vehicle and overcomes poor stability or reduced transmission performance when the wheels at either side of the vehicle are traveling or turning on a road with different coefficients of friction.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. An interference-type torque split differential, comprising:
   a differential housing;
   a first differential gear provided in the differential housing; and
   an interference torque split module provided outside the differential housing and including:
      a second differential gear outside the differential housing and connected with the first differential gear in the differential housing; and
      a first brake source and a second brake source configured to provide multiple stages of clamping force for performing torque split.

2. The interference-type torque split differential of claim 1, further comprising a turning shaft connecting the second differential gear with the first differential gear.

3. The interference-type torque split differential of claim 1, wherein the interference torque split module further includes a first interference wheel provided between the second differential gear and the first brake source, and the first brake source is configured to brake and interfere with the second differential gear via the first interference wheel for the torque split.

4. The interference-type torque split differential of claim 3, wherein the interference torque split module further includes a second interference wheel provided between the second differential gear and the second brake source, and the second brake source is configured to brake and interfere with the second differential gear via the second interference wheel for the torque split.

5. The interference-type torque split differential of claim 4, wherein the first brake source is configured to adjust a rotating speed of the first interference wheel to provide different levels of speed, and the second brake source is configured to adjust a rotating speed of the second interference wheel to provide different levels of speed.

6. The interference-type torque split differential of claim 1, wherein at least one of the first brake source and the second brake source is a clamping device or a clutch device.

7. The interference-type torque split differential of claim 1, wherein at least one of the first brake source and the second brake source is configured to directly interfere with the second differential gear by braking for the torque split.

8. The interference-type torque split differential of claim 1, further comprising a gearbox housing connected with the first brake source and the second brake source.

9. The interference-type torque split differential of claim 1, further comprising a first output gear and a first output shaft, the first output gear being provided in the differential housing and having gears engaged with gears of the first differential gear, and the first output shaft being connected with the first output gear.

10. The interference-type torque split differential of claim 9, further comprising a second output gear and a second output shaft, the second output gear being provided in the differential housing and having gears engaged with the gears of the first differential gear, and the second output shaft being connected with the second output gear.

11. An interference-type torque split differential, comprising:
  a differential housing;
  a first differential gear provided in the differential housing; and
  an interference torque split module provided outside the differential housing and including:
    a second differential gear outside the differential housing and connected with the first differential gear in the differential housing; and
    a driving source configured to provide multiple stages of driving force for performing torque split.

12. The interference-type torque split differential of claim 11, further comprising a turning shaft connecting the second differential gear with the first differential gear.

13. The interference-type torque split differential of claim 12, wherein the turning shaft is driven by the differential housing to rotate, and the differential housing is driven by a power source.

14. The interference-type torque split differential of claim 11, wherein the interference torque split module further includes an interference wheel provided between the second differential gear and the driving source, and the driving source is configured to drive and interfere with the second differential gear via the interference wheel for the torque split.

15. The interference-type torque split differential of claim 14, wherein the driving source is configured to adjust or switch a rotating direction or a rotating speed of the interference wheel.

16. The interference-type torque split differential of claim 11, wherein the driving source is a driving motor.

17. The interference-type torque split differential of claim 11, wherein the driving source has a gear-driven-type transmission or a belt-driven-type transmission.

18. The interference-type torque split differential of claim 11, wherein the driving source is configured to directly drive and interfere with the second differential gear for the torque split.

19. The interference-type torque split differential of claim 11, further comprising a first output gear and a first output shaft, the first output gear being provided in the differential housing and having gears engaged with gears of the first differential gear, and the first output shaft being connected with the first output gear.

20. The interference-type torque split differential of claim 19, further comprising a second output gear and a second output shaft, the second output gear being provided in the differential housing and having gears engaged with the gears of the first differential gear, and the second output shaft being connected with the second output gear.

* * * * *